United States Patent
Stathis

(10) Patent No.: US 10,125,533 B1
(45) Date of Patent: Nov. 13, 2018

(54) SMALL FRANGIBLE SHIM

(71) Applicant: Shark Toolers, Morris Plains, NJ (US)

(72) Inventor: James Stathis, Morris Plains, NJ (US)

( * ) Notice: Subject to any disclaimer, the term of this patent is extended or adjusted under 35 U.S.C. 154(b) by 0 days.

(21) Appl. No.: 15/789,277

(22) Filed: Oct. 20, 2017

(51) Int. Cl.
*E06B 1/60* (2006.01)
*E04F 21/00* (2006.01)
*F16B 43/00* (2006.01)
*E06B 1/68* (2006.01)

(52) U.S. Cl.
CPC ........ *E06B 1/6069* (2013.01); *E04F 21/0023* (2013.01); *E06B 1/68* (2013.01); *F16B 43/009* (2013.01)

(58) Field of Classification Search
CPC ........ E06B 1/6069; E06B 1/68; F16B 43/009; Y10T 428/15; E04F 21/007; E04F 21/0023; E04F 21/0076
See application file for complete search history.

(56) References Cited

U.S. PATENT DOCUMENTS

| | | | | |
|---|---|---|---|---|
| 2,514,252 | A * | 7/1950 | Mueller | B65D 71/50 294/87.22 |
| 3,229,323 | A | 1/1966 | Hensgen | |
| 4,232,068 | A * | 11/1980 | Hoh | E06B 1/6069 428/167 |
| 5,163,255 | A | 11/1992 | Gamba | |
| 5,853,838 | A * | 12/1998 | Siems | E06B 1/6069 156/247 |
| 6,230,446 | B1 * | 5/2001 | Chalich | E06B 1/6069 16/17.1 |
| 7,108,901 | B2 | 9/2006 | Traub et al. | |
| 7,716,880 | B1 * | 5/2010 | Shray | B29C 44/583 248/188.2 |
| 7,784,751 | B1 * | 8/2010 | Bellows | A47B 91/02 248/188.2 |
| 7,802,344 | B2 | 9/2010 | Watts | |
| D679,173 | S * | 4/2013 | Parady | D8/354 |
| 9,791,256 | B1 * | 10/2017 | Beer | G01B 5/25 |
| 2005/0186395 | A1 * | 8/2005 | Traub | B29B 9/14 428/167 |
| 2010/0024321 | A1 * | 2/2010 | Scherer | E06B 1/62 52/98 |
| 2010/0242226 | A1 * | 9/2010 | Hopkins | E05C 17/54 16/82 |
| 2012/0126084 | A1 * | 5/2012 | Christeson | A47B 91/005 248/346.03 |

FOREIGN PATENT DOCUMENTS

| | | | | |
|---|---|---|---|---|
| FR | 2643104 | A1 * | 8/1990 | E06B 1/6069 |
| FR | 2846362 | A1 * | 4/2004 | E06B 1/6069 |

* cited by examiner

*Primary Examiner* — Adriana Figueroa
*Assistant Examiner* — Jessie T Fonseca
(74) *Attorney, Agent, or Firm* — Jack B. Baldini, Esq.; Baldini Law, LLC

(57) ABSTRACT

Taught here is a small frangible shim with handle for fine tune leveling which is wedge shaped, and pre-scored to enable an unneeded portion to be easily removed during use. Such shims are used in the construction industry utilized for adjusting the spacing of various construction members. The shim may be fashioned from any suitable material to provide stability, ease of use, and ease of manufacture. Further, the shim contains surfaces with properties of both friction to retain the shim in place once deployed and smoothness to allow the shim to slide easily into position. The shim taught here is small compared with existing shims for use in situations where delicate, fine-tune adjustments of leveling is desired.

12 Claims, 5 Drawing Sheets

SMALL FRANGIBLE SHIM

SMALL FRANGIBLE SHIM

SMALL FRANGIBLE SHIM

SMALL FRANGIBLE SHIM

SMALL FRANGIBLE SHIM

10,125,533 B1

SMALL FRANGIBLE SHIM

FIELD OF THE INVENTION

Taught here is a small frangible shim with handle for fine tune leveling which is wedge shaped, and pre-scored to enable an unneeded portion to be easily removed during use. Such shims are used in the construction industry utilized for adjusting the spacing of various construction members. The shim may be fashioned from any suitable material to provide stability, ease of use, and ease of manufacture. Further, the shim contains surfaces with properties of both friction to retain the shim in place once deployed and smoothness to allow the shim to slide easily into position. The shim taught here is small compared with existing shims for use in situations where delicate, fine-tune adjustments of leveling is desired.

BACKGROUND

Shims are common and long known in the art for use in situations where it is desired to level construction members or otherwise make two construction members meet exactly or otherwise align. This out of alignment or lout of level situation is a common occurrence as a result of warped building materials, foundation shifts, inexact measurements and the like. A shim is used to fill the gap or cause an out of alignment construction element to get in alignment. A shim has a load bearing function in that it must support the construction element sufficiently to keep it in its aligned or leveled orientation. A wedge shim will be driven between two construction members just far enough to put the members in the proper orientation. Then, the rest of the shim may stick out and be an aesthetic eyesore. The protruding portion is typically then cut or broken off to make the finished surface completely flush. This can be a nuisance or in some cases impossible, especially in situations where the construction elements being aligned are delicate and easily breakable during this process.

There have been attempts to provide shims that are scored to provide natural break points with clean lines.

There also have been attempts to provide shims made of materials other than wood to provide varying degrees of strength and breakability.

For example, U.S. Pat. No. 5,163,255 titled CONSTRUCTION SHIMS, discloses, "a woodworking machine comprising one or more sets of parallel rotating blades position in or above a flat worktable surface such that multiple sets of parallel grooves of a controlled depth can be cut into a wood block moved over the table surface and above, below or between rotating blades, The product produced by the machine is of a unitary construction comprised of multiple wedge shaped shims held together by a breakable membrane between the shims." Here, the shims are wooden and configured such that they are readily breakable from each other, i.e., a 'set' of shims, but each individual shim is not scored such that it is adjustably sizeable for individual use and the manner of making them would prevent the ability to make a shim of the size taught here.

In another example, U.S. Pat. No. 6,230,446 titled FRANGIBLE WEDGE SHIM FOR CONSTRUCTION, discloses, "a plastic wedge shaped shim for leveling which is pre-scored to enable protruding section to be broken off. Parallel, straight, scores are formed at regular intervals on the top surface of the shim. These scores form teeth enabling stacked shims to interengage one another when one is placed inverted on another. The underside of the shim has recesses configured such that there exists a zone of constituent material which has equal localized thickness measurements along that portion of the length of the shim wherein scores and the recess formed in the underside of the shim are in overlying relationship. In an alternative embodiment of the invention, the recesses form cleats for resisting sliding or other displacement of the shim." Here, the idea of scoring a shim to enable breakage along a predefined line is introduced and using a material other than wood is introduced. However, this shim is also inherently larger than contemplated by the disclosure here as it is an object to allow the shims to be interengaged by inverting upon each other to form a larger leveling support. This is a key feature of this invention and requires the opposite surfaces to be configured to create an overlying, interengageable relationship. Moreover, the formed cleats here, a sawtooth configuration would hinder the operation of the shim taught by the instant disclosure where a very small space, with fine tune leveling is addressed.

In another example, U.S. Pat. No. 7,108,901 titled SHIM, discloses, "shims comprising a mixture of plastic and natural fibers originating from a wet processed cellulose fiber based waste source material include an elongate body that tapers down from a thick end to a thin end. A series of ridges and grooves or valleys are formed in at least one face of the body traversing the width of the body from a point adjacent the thick end to a point beyond the longitudinal mid-point of the body. The base of the valleys each form individual break lines preferably spaced apart at predetermined intervals. A raised rim or ridge preferably extends about the outer boundaries of the face in which the ridges and grooves are formed." Here, again, the idea of a material other than wood is implemented and a series of ridges or grooves, a pre-scoring feature, is implemented to form individual break lines. However, here, once again, the shim is contemplated to be a normal size wherein there is a raised rim or ridge extending around the outer boundaries of the shim in order to assist with ease of deployment and preventing the scored ridges to hang up on the elements to be leveled. If this configuration were implemented in a smaller shim taught here, where the outer boundary would necessarily comprise a greater percentage of the overall shim area, the breakage lines would be hindered rendering them almost useless.

In another example, U.S. Pat. No. 7,802,344 titled AFFIXABLE PLASTIC SHIM discloses, "a plastic shim that has a hole for fixing the shim to a wide variety of objects. The shim may also be breakable for use with smaller applications, while also being usable for larger applications without breaking. In a preferred embodiment, each of the breakable sections has a hole for a screw or nail, so that each of the breakable sections is separately affixable." Here, there is a contemplation of use in smaller applications. However, the shim described in this patent is not necessarily wedge shaped for use in leveling applications, but rather a shim used as a spacer and is generally not applicable to the use described in the instant disclosure.

Finally, in another example, U.S. Pat. No. 3,229,323 titled, HINGE ADJUSTING SHIM, discloses, "a hunge adjusting shim, the function of which is to facilitate and expedite the proper hanging of a door upon a frame or similar support." Here, the contemplated shim also embodies a scored to provide lines of breakage, but is generally the same width and shape as a common door hinge and used specifically therewith. It is substantially wider from side to side than it is longer from thin end to thick end. The shim described here and the shim as taught in the instant disclosure would not be interchangeable and would each, if configured as the other, destroy each functionality.

None of the foregoing references, alone or in combination, teach the salient and proprietary features or construction of the present disclosure, and as such, fail to be useful as a small shim with a handle, useful in fine-tune leveling and/or alignment applications as described herein. For example, scoring to provide breakability tends to weaken the overall strength of shims and affects the slide ability to slide into the gaps the shim is intended to fill. In one reference, this is overcome by providing an outer rim. In the small application described herein, this solution would destroy the functionality as it would make the shim of the size described herein less breakable than needed and we would be back to a situation where the shim would need to be cut or broken and likely destroying the fine construction elements being aligned.

The present disclosure teaches several embodiments that provide a very convenient, inexpensive, small shim useful in fine-tuning leveling or alignment applications, such as in (but not limited to) fine millwork, decorative trim and molding applications. The present disclosure also teaches embodiments for deploying such a small shim through the use of an attached handle that, if not for the anticipated breakage points employed, would stick out and otherwise destroy the functionality, but without, in such a fine-tuning small deployment, would make the shim almost impossible to manipulate into a desired spot.

SUMMARY

The present disclosure teaches embodiments that utilize existing materials configured in such a way as to provide: (i) a small wedge shaped shim; and (ii) in some embodiments, said small shim also comprising a handle; and (iii) in some embodiments, said small shim also comprising scored grooves, valleys or ridges to serve as breakage points; and (iv) in some embodiments, said small shim also comprising surfaces with friction properties and/or with surfaces with smooth gliding properties, or surface otherwise configured to contain a surface that glides smoothly in one direction and resists movement in the opposite direction.

In one embodiment, the shim described herein is approximately square shaped at its thick end with a uniform width along its entire length and tapering down to a razor thin thin end.

In one embodiment, the shim described herein has a small handle protruding from the flat end surface of its thick end. In one embodiment, the place where the handle meets the flat end surface can have a scored groove to allow the handle to break cleanly from the flat end surface where the entire shim is required for deployment.

In one embodiment, the shim described herein is approximately one and three quarters inches in total length with an additional one quarter inch if measured to the end of the handle.

In one embodiment, the shim described herein is approximately a one quarter inch square at its thick end with a one quarter inch width and a razor thin thickness at the end of its thin end and tapering evenly from the thick end to the thin end.

In one embodiment, the shim described herein has scored grooves at approximately every one quarter inch along its length on both its top surface and bottom surface.

In one embodiment, the shim described herein has scored grooves such that the thickness of material remaining measured straight down between the top surface and the bottom surface is approximately one-sixteenth of an inch.

In one embodiment, the shim described herein has a substantially the same and interchangeable top and bottom surface which are opposite faces of the shim that have a uniform width and a substantially the same side surfaces which are opposite faces of the shim that taper from its thick end to its thin end and are the alternate faces from the top and bottom faces.

In one embodiment, the shim described herein having scored grooves for breakability leave enough material of the shim intact to retain sufficient strength for the uses as described herein and are just deep enough to allow an easy snap and break when desired as deployed in the uses described herein.

In one embodiment, the shim described herein having a handle, in a preferred embodiment has a handle that is approximately one-eighth inch square protruding approximately one-quarter inch from the thick end allowing the user to hold and maneuver the shim into place and then provides leverage and torque at the proper breakage point.

In one embodiment, the shim described herein can be made from any of a variety of materials known in the art to provide the correct balance of strength and frangibility. Such materials include plastic, synthetic plastic, plastic with embedded microfibers, polyethylene, metal, metal alloys, ceramic, high density plastic, and graphite, or any combination. In one embodiment, the material chosen will be based upon a need for even more exacting breakage points than those provided by the one-quarter inch spaced scored grooves. In this embodiment, if a break is needed in the middle of one of the one-quarter inch sections, a razor blade or utility knife is capable of making a small cut at the exact location desired creating a custom placed scored groove and using the handle of the described shim, break off the unused portion at the new custom spot. The material chosen is soft enough to allow such a custom cut.

In one embodiment, the shim described herein has surface friction sufficient to allow the shim to slide smoothly into place and when just snug in place, resist further movement.

In one embodiment, the shim as described herein has sections created by the scored grooves. Such sections each have a taper substantially similar to the taper of the overall shim wherein the next larger section at any given point has a thickness of its smaller end just slightly smaller that the thickness of the next smaller section at its thick end to allow the shim to slide smoothly into place without any sticking.

In one embodiment, the shim as described herein can be packaged ten to a pack with a two and one-half inch by one-quarter in piece of cardboard strip with small holes punched and the shims lined up with the handles inserted into the punch holes. In this embodiment, that strip with ten such shims can be encased in a match book like covering making the shims easily accessible and protected at the same time for ease of multiple deployment in a fast and neat manner.

In one embodiment, the shim as described herein can be made from recycled materials.

DETAILED DESCRIPTION

Figure 1:
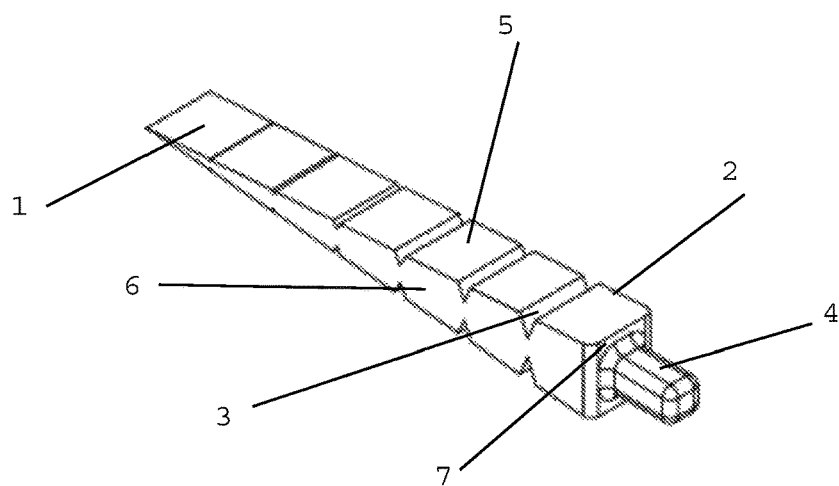
FIG. 1 depicts one embodiment of the present disclosure showing a perspective view of the shim showing its thin end (1), its thick end (2) with flat end surface (7), its top or bottom surface (5), one of its side surfaces (6), its scored grooves for breakage points (3) and its handle (4).
Figure 2:
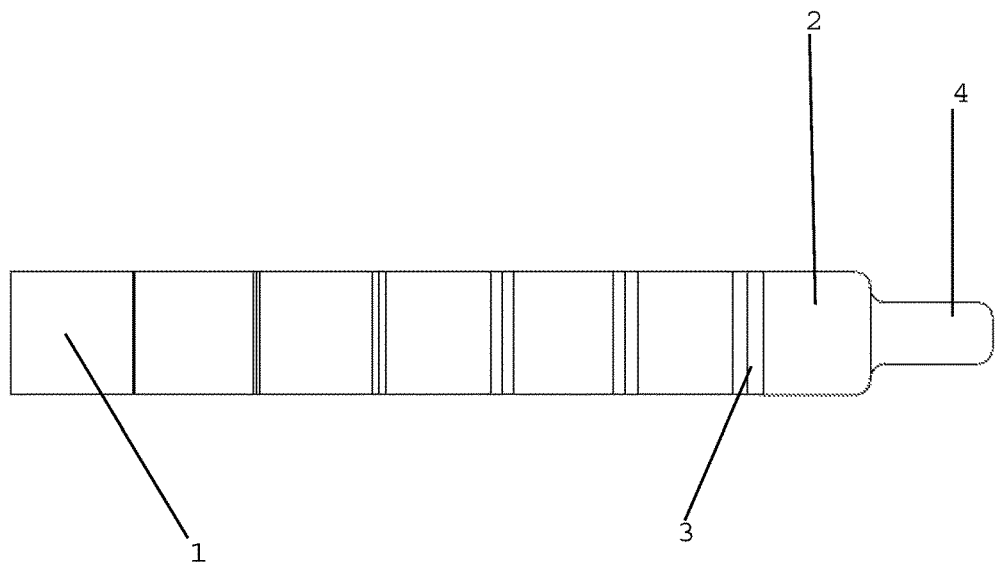
FIG. 2 depicts one embodiment of the present disclosure showing a top (or bottom) view of the shim showing its thin end (1), its thick end (2), its scored grooves for breakage points (3) and its handle (4).
Figure 3:
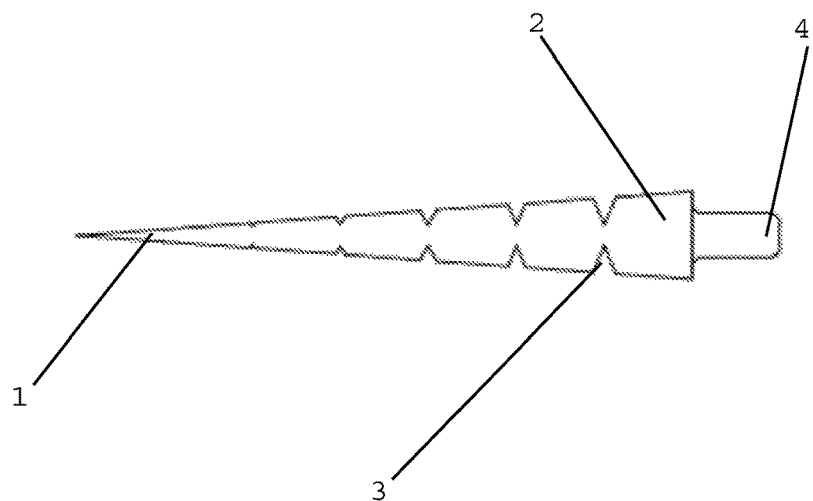
FIG. 3 depicts one embodiment of the present disclosure showing a side view of the shim showing its thin end (1), its thick end (2), its scored grooves for breakage points (3) and its handle (4).
Figure 4:
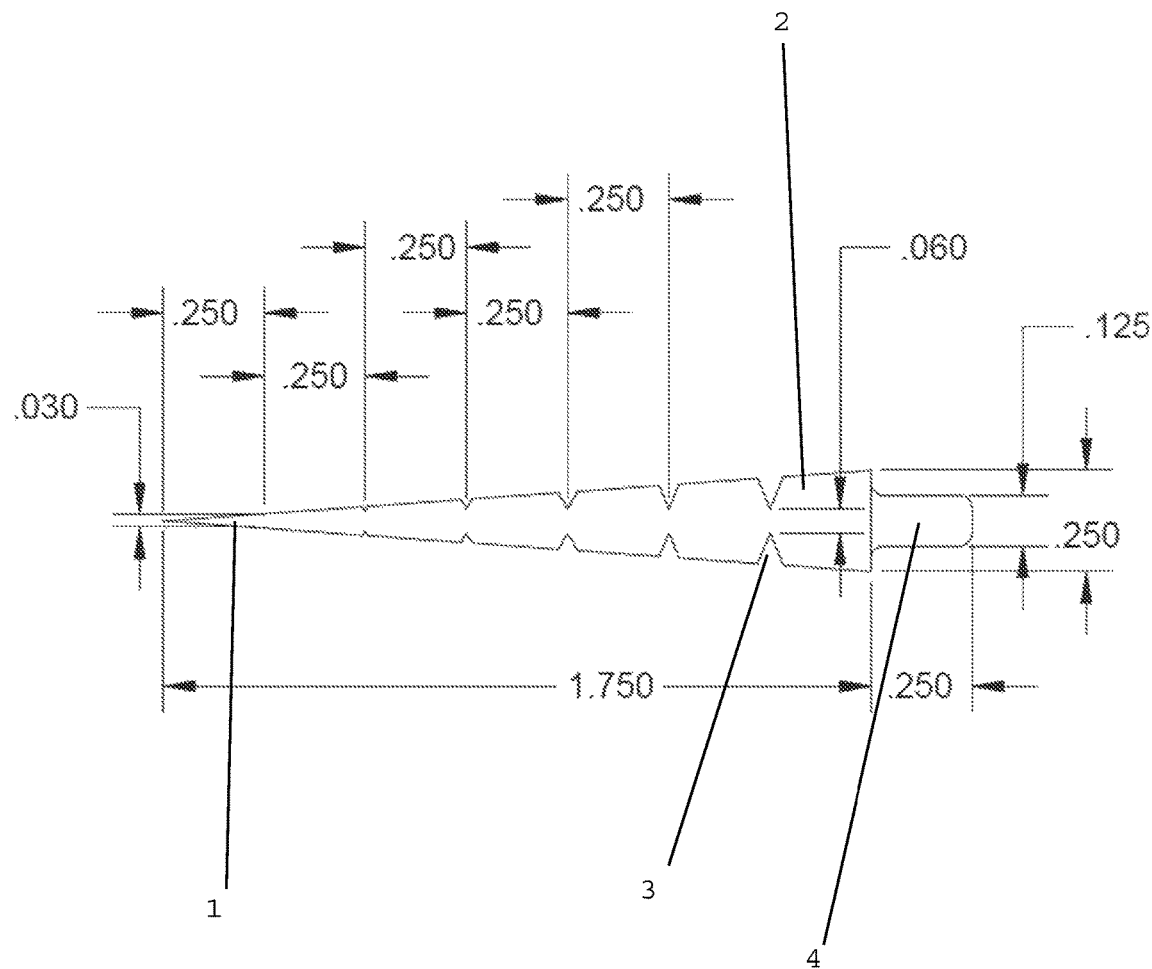
FIG. 4 depicts one embodiment of the present disclosure showing the same side view of a shim as described in FIG. 3 and showing a preferred embodiment of dimensions illustrated in inches
Figure 5:
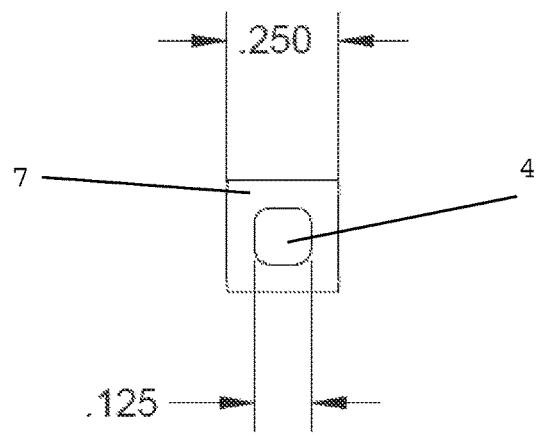
FIG. 5 depicts one embodiment of the present disclosure showing a preferred embodiment of a shim as described herein from an end view looking down from the handle (4) or thick end having a flat end surface (7) and preferred dimensions.

For clarity of disclosure, and not by way of limitation, the detailed description of the invention is divided into the following subsections that describe or illustrate certain features, embodiments or applications of the present invention.

Definitions

"shim" as used herein means a construction tool used for leveling or aligning a construction element and is substantially wedge shaped with a thick and thin end.

"scored groove" as used herein means a removed portion of material from along the length of a shim that provides a natural breakage point wherein the shim will snap off in a substantially clean break when sufficient pressure is applied.

"handle" as used herein means a protruding member from the thick end of the shim that is substantially a different size from the rest of the thick end of the shim and provides a point at which the user can use to manipulate, guide and break the shim in deployment.

"frangible" as used herein means the properties of the shim wherein it is not elastic, but is easily and cleanly breakable at its scored grooves.

"razor thin" as used herein means tapering off substantially to a thinness approaching zero.

The Device and Method of Using the Device of the Present Invention

A typical shim as described herein is formed with four faces, a top and bottom face substantially the same and opposite in orientation, and two side faces substantially the same and alternating with the top and bottom faces. The shim is constructed to be a wedge shape with a thick end and a razor thin end wherein it is substantially square at the thick end, i.e., no taller than it is wider, and substantially flat at its razor thin end, a quarter-inch wide with no substantial height at all. A small protruding handle is formed in the middle of and protruding out from the end of the thick end. Scored grooves are formed to create valleys in each of the top and bottom surfaces at the same relative position along the length of the shim to create natural breakage points approximately every one-quarter inch along the length. The scored grooves create sections of the shim, each successive section starting from the thick end is smaller, that is thinner in height but of the same width, than the section before it, except that, in one embodiment, the next thinner shim may have a thick end of that section that is just slightly thicker than the thinner end of the next thicker section to prevent the shim from catching when deployed. This embodiment is just a refinement and because of the overall size and method of deployment, will be largely unnecessary in most applications. In one embodiment, the top and bottom surfaces may be the only surfaces that actually touch the construction members being leveled or aligned and may have surface properties that allow the shim to slide easily into place and/or may have surface properties that prevent the shim from slipping once deployed into place.

While larger shims are easy to handle without an added handle member, itself being directly manipulable, in the small version of a shim described here, it would be difficult to directly manipulate the shim because as the shim gets inserted, the percentage of the shim remaining to grip becomes too small to effectively handle. Moreover, the amount of shim inserted becomes increasingly larger leaving behind a proportionally too small amount to directly handle to manipulate with the exacting precision needed in the fine tune leveling and alignment required. By adding a handle, never thought of in the shim using world because it would just be another component that would have to be dealt with in the final display as an ugly protuberance that if not dealt with in some way, would destroy the very aesthetics the shim was meant to cure. Here, though, the shim is meant to incorporate a clean break at the appropriate spot when deployed into place properly with the handle inherently attached to the piece that will be broken off. The handle further serves as a member to easily line up multiple shims in a package for easy and orderly access to as many shims as required in a given situation quickly and without fear of such small shims become lost in the bottom of a toolbox.

In one embodiment, a woodworker would install trim work as they would in any given situation. When the angles or the warped nature of walls or the trim work itself make the two ends of two adjacent pieces of trim not meet exactly, instead of relying solely on caulk to fill the gap, the woodworker can retrieve one of the shims as described herein from a package and holding it by the handle, insert behind one of the pieces of trim work to raise it ever so slightly to come into perfect alignment with its adjacent board. When in perfect alignment, the shim is snapped off hiding the portion to remain behind the trim work and the final finishing nail is driven into place. In this way, the use of caulk (which deteriorates over time and is not the professional finish that is most desired) is minimized and the aesthetics of the woodwork trim is enhanced.

EXAMPLES

The present invention is further illustrated, but not limited by, the following examples.

A typical use of the small frangible shim as described herein is when doing fine millwork and/or installing trim. Typically, trim is prefabricated wooden decorative material that is applied in corners where walls meet floors and/or ceilings. Often times, the trim has a slight warp to it. In other circumstances, the walls and ceilings and/or floors do meet perfectly square. In some circumstances, both of these factors are at play and in all circumstances, measuring and cutting the trim for installation, especially where angle cuts must meet, are imperfect. As such, there will be inherent gaps in the trim which are undesired. In many applications, these gaps are filled with caulk before painting. However, the most desirable thing is to not have substantial gaps that require caulk.

Thus, it is an object of the present teaching to provide a tool that can be used to align two ends of two pieces of trim material that are supposed to meet perfectly. In one embodiment, a first piece of trim is installed. A measurement is taken and a second piece of trim is cut to be installed in meeting with the first piece. When installing into place, it is apparent that a warp in the wall or the trim itself is making the two ends almost impossible to cut perfectly to meet, but if the second end could be raised slightly from the wall, the two ends would align in a more desired manner. In this circumstance, woodworkers have typically used scrap pieces of wood or other handy materials to fit a piece under the second end of trim to raise it slightly. This is a trial and error approach. The amount of leveling/aligning required is very minute and not something a typical shim, for example shims used in door frame leveling, would be useful. These typical shims are too big and too unbreakable to be applicable in this delicate situation. Moreover, even if re-sized and reconfigured exactly 'as-is', the new smaller version would be difficult to maneuver exactly into place.

Through the addition of a handle, the use of appropriate materials and the new substantially square and tapering to a razor thin edge orientation, the device as described herein is perfectly applicable to this situation and provides the woodworker the perfect tool to accomplish the task proposed here.

The handle provides a perfect point at which the woodworker can manipulate and position the shim to the exact position to perfectly align the trim and then using the handle, snap the unused portion of the shim leaving behind the desired portion still perfectly positioned. Because the dimensions are small, yet sturdy and manipulable, the shim breaks at its desired point, rather than having to make any cuts (which would be difficult to do cleanly in such a fine area) nor without damaging the fine trim itself.

It is envisioned that the amount of leveling or alignment is small because of the types of applications this shim is designed for use—gaps of one-quarter inch of less. Moreover, the construction members being leveled or aligned are not structural or load bearing but more decorative and it is envisioned that not a lot of stress will be borne by the shim requiring a large support area.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

Each and every feature described herein, and each and every combination of two or more of such features, is included within the scope of the present invention provided that the features included in such a combination are not mutually exclusive.

What is claimed is:

1. A shim comprising:
a top and bottom surface and two opposing side surfaces forming substantially a square shape at a thick end with a flat end surface and the shim tapering from the thick end to substantially a razor thin end along its side surfaces; and
scored grooves at intervals on both the top and bottom surfaces, said scored grooves traversing across the entire top and bottom surface at substantially the same distance on each top and bottom surface as measured from either end resulting in such grooves leaving a smaller amount of shim material at the groove locations sufficient to remain intact but provide easy breakability at those groove locations, wherein the depth of the grooves decreases from the thick end to the substantially razor thin end; and
a handle protruding from and forming a part of the flat end surface of the thick end segment of the shim wherein the perimeter of said handle is smaller than and wholly contained within the perimeter of said flat end surface, said handle being spaced from each side of the square shape of the thick end.

2. The shim of claim 1, wherein the distance from the flat end surface to the tip of the razor thin end is approximately one and three-quarters inches.

3. The shim of claim 1, wherein said flat end surface is a one-quarter inch square.

4. The shim of claim 1, wherein said handle is approximately a one-eighth inch square or diameter round protruding approximately one-quarter inch from the center of said flat end surface.

5. The shim of claim 1, wherein said scored grooves are placed at approximately one-quarter inch intervals along the length of the shim.

6. The shim of claim 1, wherein said scored grooves have equal depths on both the top and bottom surfaces such that the remaining material left before the scored grooves would meet is approximately one-sixteenth of an inch of thickness.

7. The shim of claim 1, wherein said shim is made from completely recycled materials.

8. The shim of claim 1, wherein said shim is made from materials chosen from the group: plastic, synthetic plastic, plastic with embedded microfibers, polyethylene, metal, metal alloys, ceramic, high density plastic, and graphite.

9. The shim of claim 1, wherein said top surface is finished with a roughed surface to provide friction to prevent said shim from slipping when deployed.

10. The shim of claim 1, wherein said top and bottom surfaces are finished with a roughed surface to provide friction to prevent said shim from slipping when deployed.

11. The shim of claim 1, wherein the material chosen provides a frangible property such that the shim is easily breakable at the scored grooves when a torque is applied through the handle.

12. A package of shims wherein a plurality of shims as claimed in claim 1 are housed in a rectangular cardboard strip with one-eighth inch holes punched spaced approximately one-quarter inch apart wherein the handles of said shims are inserted one per hole to line up the shims standing straight up from said cardboard rectangle.

* * * * *